United States Patent [19]

Kamijo et al.

[11] 4,198,011
[45] Apr. 15, 1980

[54] BELT TENSION ELIMINATOR FOR A SEAT BELT RETRACTOR

[75] Inventors: Ken Kamijo; Yukio Fukunaga, both of Yokohama, Japan

[73] Assignee: Nissan Motor Company, Limited, Yokohama, Japan

[21] Appl. No.: 948,398

[22] Filed: Oct. 4, 1978

[30] Foreign Application Priority Data

Nov. 8, 1977 [JP] Japan .................................. 52-134457

[51] Int. Cl.² ...................... A62B 35/00; B65H 75/48
[52] U.S. Cl. .................................. 242/107.7; 280/807
[58] Field of Search ............ 242/107.7, 107.6, 107.12, 242/107.4 R–107.4 E; 280/744–747; 180/82 C; 297/388; 200/61.58 B

[56] References Cited

U.S. PATENT DOCUMENTS

| | | | |
|---|---|---|---|
| 3,912,035 | 10/1975 | Ulert | 242/107.6 X |
| 4,002,311 | 1/1977 | Fisher et al. | 242/107.7 |
| 4,063,777 | 12/1977 | Takada | 242/107.7 X |

*Primary Examiner*—John M. Jillions

[57] ABSTRACT

A seat belt retractor with a belt tension eliminator comprises a retractor shaft, a retracting spring, means producing a belt fastening signal, and a tension eliminator which prevents retraction of the belt with a measure of slack in the same, so that the tension or stress exerted on the body of the belt wearer by the belt fastened is eliminated by rendering the force of the retraction spring to be inactive in the normal driving position and posture assumed by the belt wearer.

11 Claims, 14 Drawing Figures

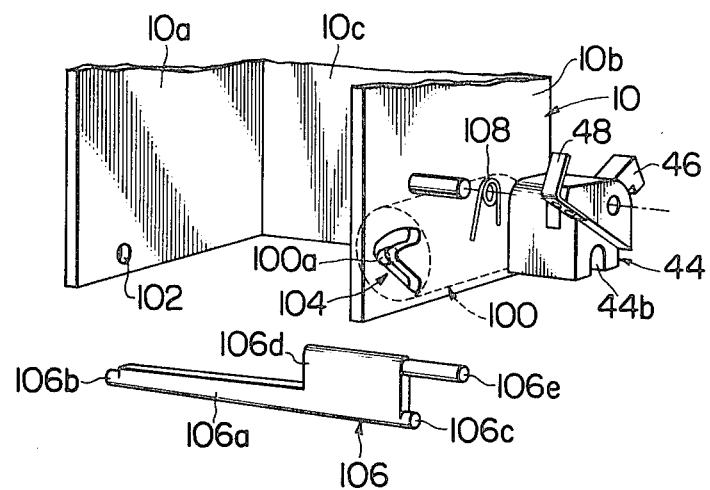
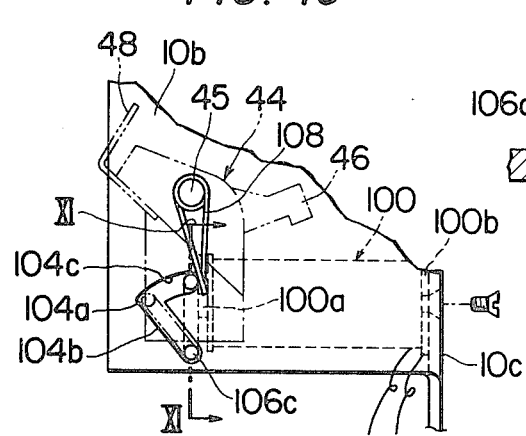
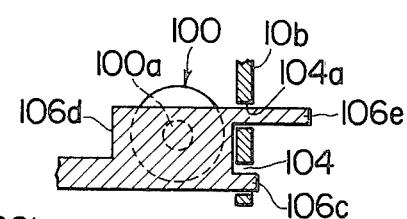

BELT TENSION ELIMINATOR FOR A SEAT BELT RETRACTOR

BACKGROUND OF THE INVENTION

This invention generally relates to an automotive seat belt retractor and particularly to a belt tension eliminator for providing a measure of slack in the belt while a user is wearing the same.

It is most objectionable to seat belt users that the pressure arisen from the belt retraction force is constantly exerted on the upper torso. Such pressure kept on the body causes more fatigue and weariness than those necessarily resulting from long driving. This is an important one of some troubles which make vehicle seat occupants reluctant to use the belts at the risk of possible fatal suffering.

SUMMARY OF THE INVENTION

It is therefore a general object of the invention to provide a seat belt retractor with a belt tension eliminator which eliminates an uncomfortable pressure exerted on the body of the safety belt wearer thus relieving the belt wearer from physical and psychological restraint by the belt fastened.

Another, more specific object of the invention is to provide a belt tension eliminator of the afore-mentioned type which deactivates retraction of the belt with a certain length of slack while the user, wearing the belt, moves only in normal driving motions.

According to a feature of the invention to achieve these objects, there is provided a blocker device which, upon fastening the belt or eventually after a certain length of time from fastening, prevents rotation of a retractor shaft in the belt retracting direction. In the meantime, a limited length of belt is withdrawable for providing the aforementioned slack in the belt.

According to another feature of the invention, the usual belt withdrawing action is not a bit influenced by the arrangement as above so that the user is free to make further forward or sideward motions as for tuning a radio, reading an instrument panel, etc. When the belt wearer resumes the normal position, the belt is retracted in the usual manner to the initially set length and retraction is then again blocked.

The features as briefly mentioned above are incorporated in an arrangement which comprises a rotary shaft adapted to wind a webbing of the belt thereupon, biasing means exerting on said rotary shaft a turning effort to retract the webbing of the belt, said rotary shaft being rotatable in the direction opposite to retractive force by manual withdrawal of the webbing, means sensing and signalling the fastening of the safety belt around the body of a user, blocker means having an operating position or preventing rotation of said rotary shaft in the belt retracting direction against the action of said biasing means when said sensing means signals the fastening of the belt and an inoperable position allowing free retraction of the belt, means for sensing the length of the webbing being withdrawn, and operating means for keeping the blocker means in its operative position when the length of the withdrawn webbing is below a predetermined degree, while bringing said blocker means into the inoperative position when said predetermined length is exceeded, to reinstate the retractive force of the biasing means.

Other objects, features and many advantages extracted from the invention will be apparent from the following detailed explanation with reference to the accompanying drawings.

BRIEF DESCRIPTION OF THE DRAWINGS

FIG. 9 is a perspective view illustrating a part of the belt tension eliminator according to the second preferred embodiment of the invention;

FIG. 10 is a side elevation of part of the belt tension eliminator shown in FIG. 9, and FIG 11 is a sectional view taken along the line XI—XI of FIG. 10.

Figure 1:
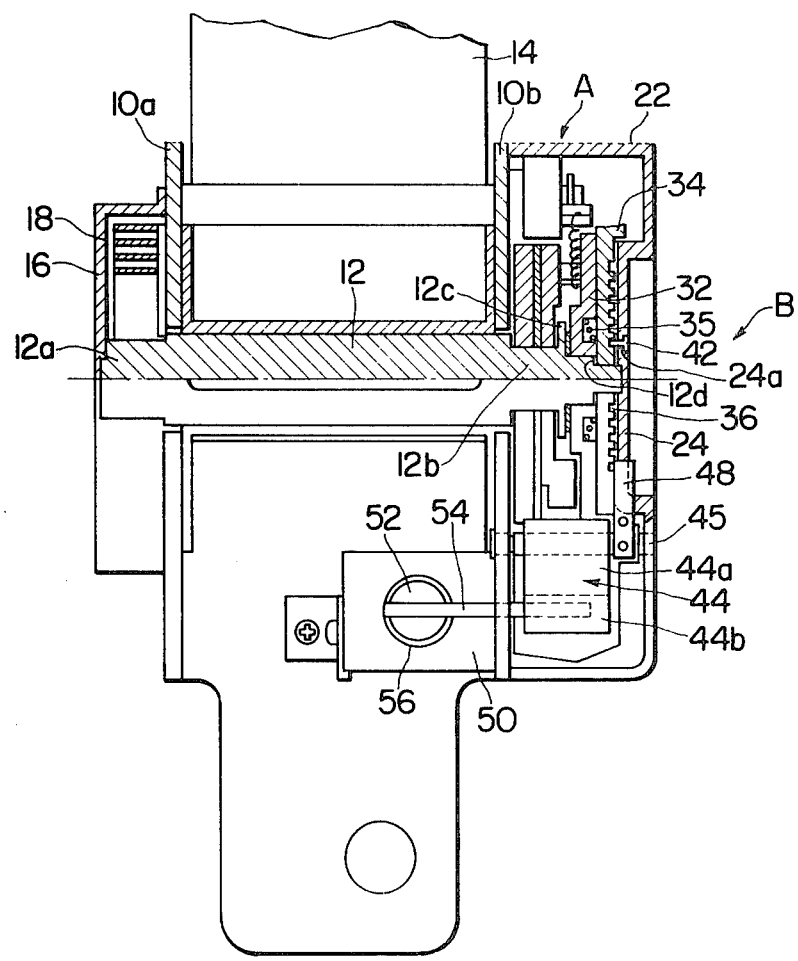
FIG. 1 is a front elevation partly in section of the seat belt retractor having a belt tension eliminator according to a first preferred embodiment of the invention.
Figure 2:
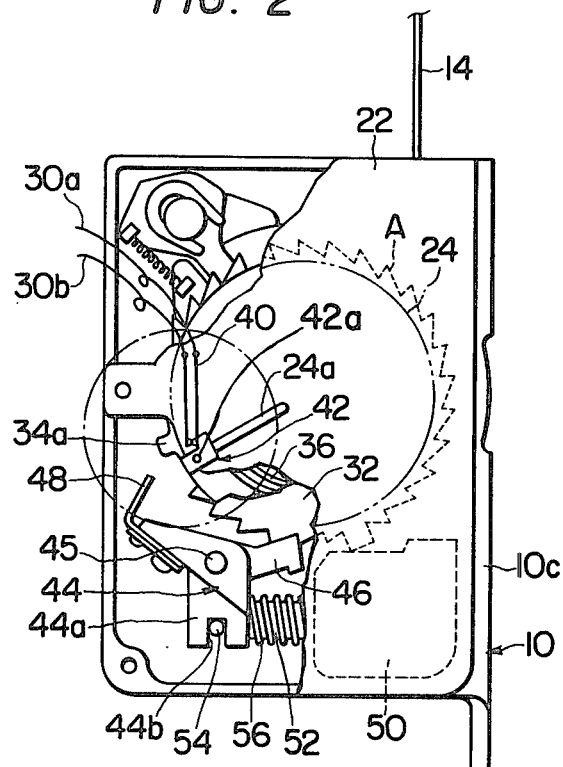
FIG. 2 is a partly cut-away side elevation of the seat belt retractor shown in FIG. 1.

With particular reference to FIGS. 1 and 2, indicated by numeral 10 is a generally U-profiled housing consisting of two side panels 10a and 10b and a base panel 10c (see FIG. 9). A rotary shaft 12 extends outwardly through bores (no numeral) formed at the respective side panels. A webbing 14 of the safety belt is at one end secured to the rotary shaft 12. One end 12a of the shaft outward of the side panel 10a is enclosed by a generally cylindrical spring cover 16, the extreme end of the shaft 12 being journalled to the end wall (no numeral) of the spring cover 16. The latter houses a retraction spring 18 wound around the shaft 12 in the manner well known. The rotary shaft 12 is thus constantly biased by the spring 18 in a direction retracting or winding up the webbing 14 onto the shaft 12.

An emergency lock mechanism generally indicated by a symbol A and a tension eliminator assembly indicated by a symbol B are arranged on the opposite end 12b of the shaft 12 in the manner described below. A cover 22, for instance of rectangular shape as in FIG. 2, encompasses these assemblies and is fastened to the side panel 10b. The extreme end of the shaft end portion 12b is journalled to the end wall of the cover 22.

The emergency lock mechanism A may be of any known type which blocks the rotation of the shaft 12 in the belt withdrawing direction during violent forward movement of the belt wearer as in collision of the vehicle.

The belt tension eliminator B, on the other hand, just pertains to the invention and will be fully explained below: A ratchet wheel 32 is fixedly mounted on the shaft end 12b outside of the emergency lock mechanism A. The latter is separated from the ratchet wheel 32 by a radial flange 12c integrally extending from the shaft 12, which at the same time prevents axial inward movement of the ratchet wheel 32.

The shaft end portion 12b just outward of the ratchet wheel 32 is stepped down to define an annular shoulder 12d. Abutting the annular shoulder 12d is a wheel 34 formed on its outer surface with a voluted groove 36 for the purpose described later, which is freely rotatably carried by the shaft end 12b. The wheel 34 is held in frictional pressure contact with the ratchet wheel 32 by means of a spring 35 which is accommodated in an annular groove (no numeral) formed in the outer surface of the ratchet wheel 32 and is compressed by tight contact between the ratchet wheel 32 and the grooved wheel 34. These are therefore rotatable almost together unless one of them is locked against rotation by some means.

The aforementioned end wall of the cover 22 is recessed at its center area to present a disc-shaped portion 24 in close contact with the outer surface of the grooved wheel 34. It would be thus apparent that the three circular members 32, 34 and 24 are concentrically arranged on the shaft end in surface contact with one another, thus forming an essential part of the tension eliminator.

The part encircled by a dot-dash line in FIG. 2 is a switch mechanism mounted on the disc 24. Specifically, the electric switch 40 consists of a movable element 40a and a fixed element 40b disposed in a circuit arrangement 30 respectively via lead wires 30a and 30b, as is apparent from FIG. 8.

The disc 24 is formed with a radial slot 24a which terminates short of the periphery of the disc 24. A slide block 42 of inverted L shape rests on the outer surface of the disc 24 and has a leg 42a which, passing through the radial channel-shape slot 24a, is slidably fitted in the groove 36 (see FIGS. 4 to 6). Thus, the slide block 42 is slidingly moved inwardly along the guide channel 24a upon rotary movement of the grooved wheel 34. The slide block 42 is further formed with two ramps 42b and 42c for the purpose described below.

The aforementioned switch 40 is so located that, when the leg 42a of the slide block abuts against the outmost end of the radial slot 24a, the slide block 42 at its ramp 42b engages the movable element 40a to bring it into contact with the fixed element 40b, thus closing the switch 40.

Figure 3:
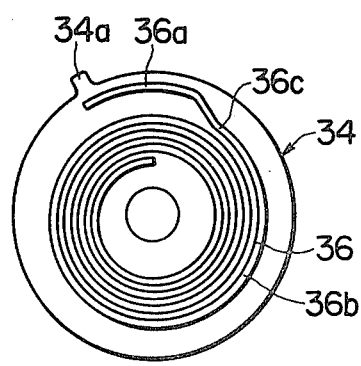
FIG. 3 is a side elevation of a constituent element of the belt tension eliminator shown in FIG. 1.

Details of the grooved disc 34 are depicted in FIG. 3. As shown, the groove 36 consists of an initial arc section 36a of a certain length and a volute section 36b which convolves to the center area of the wheel 34. The arc section 36a and the volution 36b are stepwise adjoined together via a small linear section 36c. The grooved wheel 34 is further formed with a radial outward extension 34a adjacent the outer end of the groove 36.

As best seen in FIG. 2, a blocker element indicated by numeral 44 is generally of wing shape and is pivotally mounted on a fixed stud 45. One wing of the blocker element 44 forms a pawl 46 engageable with the ratchet wheel 32, while the other wing provides a stop member made of a flat spring 48 that will be later described. It would be apparent that the pawl 46, in mesh with the ratchet wheel 32, prevents rotation of the wheel 32 in clockwise direction in FIG. 2, i.e., in the belt retracting direction, while permitting an intermittent rotary movement of the wheel 32 in counter-clockwise direction.

Figure 4A:
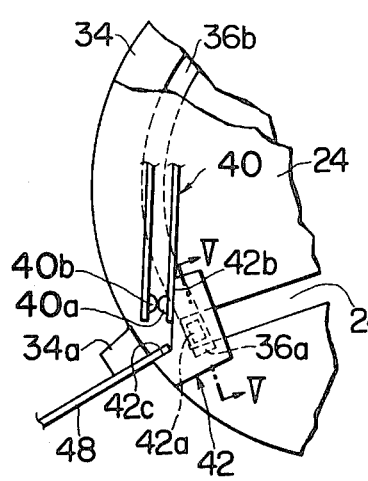
FIGS. 4A and 4B are enlarged elevational views of an important part of the belt tension eliminator shown in FIG. 1 in two different operational stages.
Figure 4B:
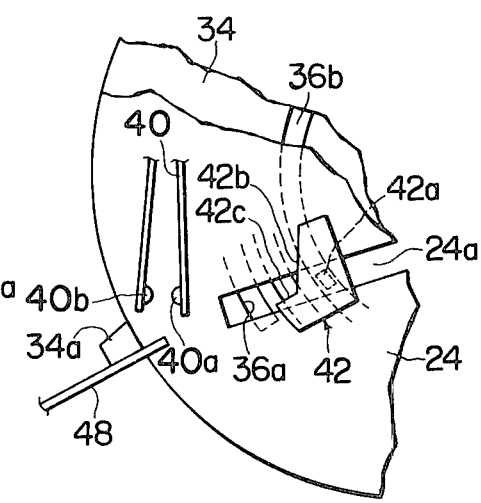
Figure 6:
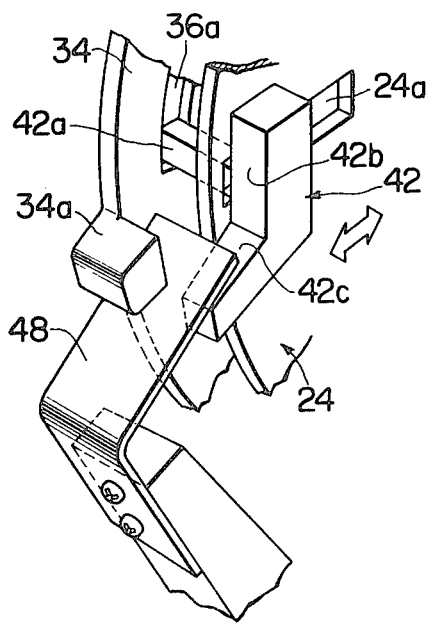
FIG. 6 is an enlarged perspective view of part shown in FIGS. 4A and 4B.
Figure 5:
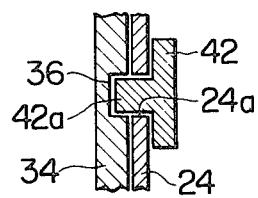
FIG. 5 is a sectional view taken along the line V—V of FIG. 4A.
Figure 7A:
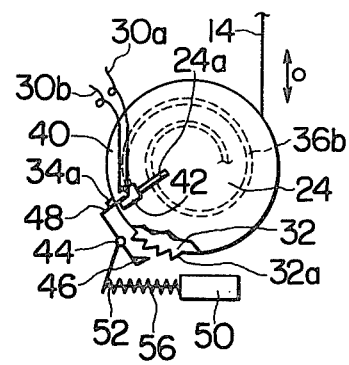
FIGS. 7A, 7B and 7C are schematic elevational views of the belt tension eliminator shown in FIG. 1 in three different operational stages.
Figure 7B:
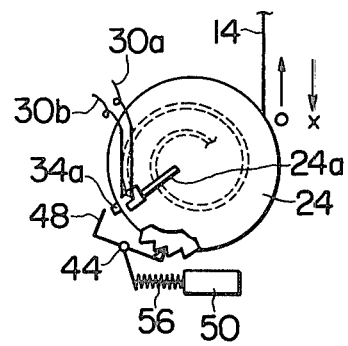

Indicated by 50 is a solenoid assembly having a plunger 52 reciprocally movable in dependence on energization and de-energization of the solenoid. The plunger 52 has an actuator pin 54 laterally extending from the end of the plunger. The pin 54 is fitted in the bifurcation 44b formed at the base portion 44a of the blocker element 44. The blocker element 44 is thus pivotally movable about the stud 45 in accordance with the reciprocal movement of the plunger 52. A spring 56 is wound around the plunger and has one end bearing against the pin 54 to bias the blocker element in clockwise direction in FIG. 2, that is, in the direction disengaging the pawl 46 out of ratchet wheel 32 as seen in FIG. 7A. In this condition, the flat spring 48 is put between the ramp 42c of the slide block and the radial extension 34a of the grooved wheel 36 in their rest position, as illustrated in FIGS. 4A and 6. It should be noted that a part of the integral disc 24 and cover 22 is cut away to afford a space lodging the blocker element 44.

Figure 8:
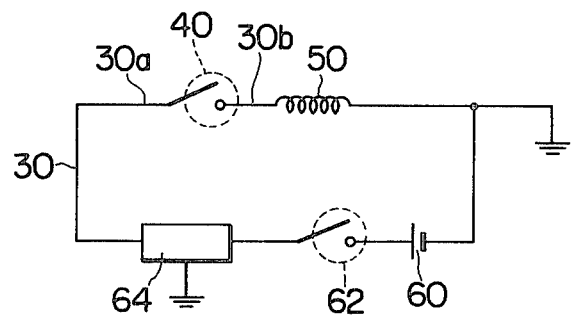
FIG. 8 is a circuit diagram of an electric system used in the belt tension eliminator shown in FIG. 1.

Illustrated in FIG. 8 is a circuit diagram in which the switch 40 is connected with the solenoid 50. Denoted by 60 is a battery. Further disposed in the circuit 30 is another switch 62 which is, for instance, mounted on a buckle (not shown) of the belt to close when the belt tongue has been snapped into the buckle, that is, when the belt has been worn by the user. Of course, any other expedient can be substituted for the buckle mounted switch that can sense fastening of the belt by the user. It would be readily understood from FIG. 8 that the solenoid 50 is energized only when the switches 40 and 62 are both closed.

Preferably, a delay circuit 64 is disposed posterior to the switch 62 in the circuit arrangement. The circuit 64 retards energization of the solenoid 50 for a predetermined length of time after closure of the switch 62, for the purpose to be explained in connection with the operation.

The tension eliminator thus constructed operates in a manner hereinafter fully described, reference being particularly made to FIGS. 4 to 7.

When the belt is not yet buckled in unused condition, the mechanism althogether assumes the rest or inoperative position: The slide block 42 is in its outmost position where the ramp 42b engages the movable element 40a to bring it into contact with the fixed element, as seen in FIG. 4(A). However, the solenoid 50 is kept deenergized because the buckle switch 62 is open. It follows that the plunger 52 is protracted by the action of the spring 56 to rock the blocker element 44 in clockwise direction. The element 44 comes to the position in FIG. 7A where the pawl 46 is away from that ratchet wheel 32, while the flat spring 48 is tightly interposed between the ramp 42e and the radial extension 34a.

The retraction spring 18 under no influence of the tension eliminator exerts a full retraction force on the shaft 12. As usual, the webbing of the belt can be withdrawn at will against the retraction spring 18.

When the belt user then puts on the belt by buckling, the buckle switch 62 is now closed. The slide block 42 is still kept in its outmost rest position so that the movable element 40a is in contact with the fixed element 40b to close the switch 40. Since both switches 40 and 62 are now closed, the solenoid 50 is energized to retract the plunger 52 against the spring 56. The blocker element 44 is then swung in counterclockwise direction to a position shown in FIG. 7B where the pawl 46 engages the ratchet wheel 32, while the flat spring 48 is away from between the ramp 42e and the extension 34a. It follows that the ratchet wheel 32 is prevented from rotation in the belt retractive direction or in clockwise direction in the drawing, while intermittent angular movement in the withdrawing direction is permitted as briefly mentioned before.

The grooved wheel 34 now free from the stop action by the flat spring 48 is rotatable together with the ratchet wheel 32 in the belt withdrawing direction. The leg 42a of the slide block traces the groove 36 at the wheel 34 during such angular movement. It should be noted here that as long as the leg 42a is in the arc shaped section 36a of the groove, the switch 40 is kept closed and therefore the blocker element 44 is held in the operative position shown in FIG. 7B. That is, the webbing corresponding in length to the arc section 36a of the groove can be withdrawn without deactivating the blocker element and therefore tension eliminator. This withdrawable part of webbing, for instance of 10 mm length, provides a comfort slack which alleviates the belt wearer's sensation of tension or restrain. It would be apparent that the slack is available merely by slight motions conscious or unconscious, made by the belt user to choose a comfortable posture. If the webbing is withdrawn beyond this length, the retractive force is reinstated as will be described in the later passages.

The delay timer 64 inserted in the circuit in FIG. 8 retards signalling for buckling of the belt for a predetermined length of time after closure of the switch 62, as already mentioned. For this length of time, the belt retracting action lasts and is then followed by the operation as explained above. Consequently, if the belt user fastens the belt with an extra length of webbing withdrawn, the belt can be retracted to an appropriate length by the time of restoration of the retractive force.

Figure 7C:
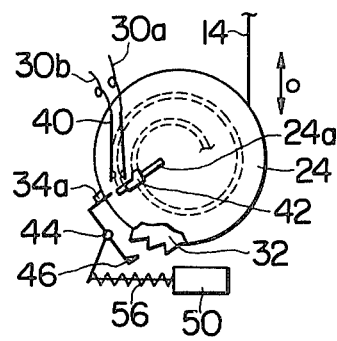

When now the belt wearer leans forward beyond the aforementioned slight movements as for tuning a radio, the webbing is pulled out to a greater length against the retraction spring 18. This causes the grooved wheel 34 together with the ratchet wheel 32 to further rotate in counter-clockwise direction. Thus, the slide block 42 at its leg 42a is passed from the arc section 36a to the volute section 36b while sliding along the guide slot 24a radially inwardly of the disc 24. As a result, the ramp 42b is moved away from the movable element 40a of the switch 40 to open the same. The solenoid 50 is thus deenergized, the plunger 52 protracting by the action of the spring 56. The blocker element is swung in clockwise direction as shown in FIG. 7c, whereupon the pawl 46 disengages from the ratchet wheel 32 while the flat spring 48 is engageable with the extension 34a of the grooved wheel 34 in dependence on the angular position of the wheel 34. Since the flat spring 48 is no longer supported by the ramp 42b, the flat spring 48 yields to the depression by the extension 34a of the rotating wheel 34, permitting uninterrupted rotation of the wheel past the flexed spring 48. The strength of the flat spring 48 is appropriately selected for this purpose. It would be thus seen that the webbing can be withdrawn to a desired extent in opposition to the retractive force constantly exerted on the shaft 12.

When the belt wearer resumes the normal posture from the aforementioned condition, the ratchet wheel 32 and the grooved wheel 34 rotate together in clockwise direction by the action of the spring 18, and therefore the leg 42a of the slide block slides along the convolution while moving along the slot 24a outwardly. The extension 34a of the grooved wheel in this instance abuts the underside of the flat spring 48 and flexes it upwardly to ensure continuous rotation of the grooved wheel 34.

As soon as the leg 42a reaches the inner end of the arc section 36a of the groove 36, the ramp 42b brings the movable element 40a into contact with the fixed element 40b to reclose the switch 40. The blocker element 44 is then brought into operation as is apparent from the foregoing. Since the retraction is prevented at this moment, the leg 42a rests against the inner end of the arc section 36a of the groove 36 and is prevented from advancing toward the outer end of the groove 36. Thus, the slack of the aforementioned length is maintained after temporary withdrawal. Of course, further withdrawal from this position is possible, repeating the operation as mentioned previously.

It would be apparent that if the belt wearer exerts an abrupt strong pressure onto the webbing as in collision, the emergency lock mechanism 30 immediately locks the withdrawal movement of the belt to prevent the body of the belt wearer from being violently thrown forward, for instance, against the instrument panel or windshield.

When the belt is unbuckled, the buckle switch 62 opens and the blocker element 44 resumes the position shown in FIG. 7A. If the leg 42a of the slide block rests against the inner end of the arc section 36a as described just above, the leg 42a automatically restores to the outer end of the arc section 36a by the action of the retraction spring 18 revived. A measure of unretracted webbing, if remained after unbuckling, is also fully retracted by this spring, while the grooved wheel 34 is prevented from rotation with the shaft 12 by the stop action of the flat spring 48 clamped between the extension 34a and the ramp 42c. This is enabled by the fact that the grooved wheel 34 is rotatable relative to the shaft 12 in frictional engagement with the ratchet wheel.

In FIGS. 9 to 11 is illustrated a modified arrangement of the part actuating the blocker element 44 in which a solenoid 50 is replaced by an electromagnet 100. As best seen in FIG. 9, the side panels 10a, 10b of the housing 10 are respectively formed with a circular aperture 102 and an angled slot 104, the elbow 104a of which substantially aligns with the circular aperture 102. The angled slot 104 consists of a lower rectilinear section 104b and an upper arc section 104c extending laterally from the elbow toward the blocker element 44.

A pivotal plate lever 106 made of a single pressed iron plate has at its bottom an elongate axis 106a one end 106b of which is rotatably carried by the circular aperture 102 with the opposite end 106c received in the lowermost end of the slot 104. The axis 106a thus extends over the length of the housing 10 in parallel with the shaft 12. A plate 106d is thus rockable about the axis 106a. A rod like extension 106e of the top of the plate 106d is passed through the arc section 104c of the slot outwardly, as is clearly seen in FIG. 11. Accordingly, the rod like extension 106e slides along the arc section in accordance with the pivotal movement of the entire plate lever 106. The outer end of the extension 106e is fitted in the bifurcation 44b of the blocker element 44 for pivotal movement thereof about the stud 45, just as in the previous embodiment.

The electromagnet 100 as represented by a broken line in FIGS. 9, 10 is situated inside of the side panel 10b generally along the same. Indicated at 100a is a projected end of an electromagnet core (not shown) which abuts against the plate 106d when the rod like extension 106e is positioned in the outer end of the arc section 104c. The opposite end 100b of the electromagnet core is fastened to the base wall 10c of the housing as by screwing.

Designated by 108 is a wire spring lightly wound around the stud 45, having one end bent to be fixed to the outer end of the arc section 104c and the opposite end bearing against the rod like extension 106e. It follows that the spring 108 exerts a biasing force upon the plate lever 106 to rock about the axis 106a in counter-clockwise direction until the extension 106e falls in the elbow 104a of the angled slot 104.

The operation of the modified actuating part as arranged above is hereinafter described. As long as the electromagnet 100 is deenergized, the plate lever 106 is held in the aforementioned position by the action of the spring 108.

Upon energization of the electromagnet 100, the plate lever 106 is attracted by the electromagnet core to rock about the axis 106 in clockwise direction in FIG. 10 against the spring 108. The plate 106d then rests against the projected end 100a of the electromagnet core. As a result, the blocker element 44 is pivoted about the stud 45 in counter-clockwise direction, with the pawl 46 brought into registry with the ratchet wheel 32 as is fully explained in connection with the first embodiment.

As soon as the electromagnet 100 is deenergized, the plate lever 106 returns to the initial position in which the pawl 46 is away from the ratchet wheel 32.

Further operation of the tension eliminator and the effects obtained thereby is just the same as in the first embodiment so that further explanation is omitted for brevity.

What is claimed is:

1. A seat belt retractor having a belt tension eliminator comprising
    a rotary shaft adapted to wind a webbing of the belt thereupon,
    biasing means exerting on said rotary shaft a turning effort to windingly retract the webbing,
    said rotary shaft being rotatable in the direction opposite to that of the retractive force by withdrawing movement of the webbing,
    means producing a signal representative of fastening of the belt,
    blocker means having an operative position for preventing rotation of said rotary shaft in the belt retracting direction against the action of said biasing means in response to said belt fastening signal and an inoperative position allowing free retraction of the webbing, and
    means responsive to withdrawal movement of the belt and measuring the length of the withdrawn webbing for keeping the blocker means in the operative position when the length is below a predetermined degree, while bringing said blocker means into the inoperative position when said predetermined length is exceeded to reinstate the retractive force of said biasing means.

2. A seat belt retractor according to claim 1, further comprising delay means for retarding the movement of said blocker means into the operative position for a predetermined length of time after production of said belt fastening signal.

3. A seat belt retractor according to claim 1 or 2, in which said blocker means comprises a ratchet wheel 32 fixedly carried on one end of said rotary shaft and a pivotally movable pawl element engageable with said ratchet wheel for preventing rotation thereof in the belt retracting direction while permitting intermittent rotation of the ratchet wheel in the opposite direction.

4. A seat belt retractor according to claim 3, in which said means responsive to the withdrawal movement comprises a rotary member adapted to be rotated by withdrawal movement of the webbing,
    a reciprocal member reciprocally movable by translating the rotary movement of said rotary member to the linear reciprocal movement,
    said rotary member and said reciprocal member being arranged so that the reciprocal member is in its rest position during angular movement of said rotary member by a predetermined degree corresponding to said predetermined length of the withdrawn webbing, while being movable from the rest position by further rotation of said rotary member,
    switch means adapted to be closed by said reciprocal member at its rest position, while opening when said reciprocal member is away from the rest position,
    actuator means operable for keeping the engagement of the pawl with the ratchet wheel in response to closure of said switch means when said belt fastening signal is present, while moving the pawl member out of engagement with the ratchet wheel when said switch means opens.

5. A seat belt retractor according to claim 4, in which said means responsive to the fastening of belt comprises another switch means serially connected with said first-mentioned switch means.

6. A seat belt retractor according to claim 5, in which said actuator means comprises a solenoid energizable in response to closure of both said switch means, a plunger connected to said pawl member and axially movable by energization of said solenoid to an operable position causing a pivotal movement of said pawl element and a spring normally biasing said plunger to an inoperative position.

7. A seat belt retractor according to claim 6, in which said delay means is a delay circuit disposed between said another switch means and said electromagnetic means.

8. A seat belt retractor according to claim 5, in which said actuator means comprises an electromagnet magnetizable in response to closure of both said switch means, a pivotal steel lever connected to said pawl element and limitedly rockable by magnetization of said electromagnet to an operative position causing a pivotal movement of said pawl element and a spring normally biasing said pivotal lever to an inoperative position.

9. A seat belt retractor according to claim 5, in which said rotary member includes a wheel mounted on said rotary shaft for rotation relative to the same, said wheel being resiliently biased against said ratchet wheel for frictional drive-transmitting engagement therewith, said wheel formed at its outer surface with a groove consisting of an arc section of a predetermined length and a volute section stepwise adjoined to the arc section and convolving to the center of said wheel.
    and in which said reciprocal member includes a slide block having a leg slidably received in said groove of the wheel and adapted to be guided along a stationary rectilinear guide channel, said slide block being in the rest position when said leg is received within said arc section, while moving away from the rest position along said rectilinear guide channel when said leg advances along the volute section by rotation of said wheel.

10. A seat belt retractor according to claim 9, further comprising stop means for preventing rotary movement of said rotary member when said another switch responsive to fastening of the belt is open.

11. A seat belt retractor according to claim 10, in which said stop means includes a radial outward extension formed at said wheel, a ramp surface formed on said slide block, said ramp surface adjoining in a vis-a-vis relationship with said radial extension in the rest position of said slide block and a flat spring formed integral with said pawl element and extending generally in the direction opposite to said pawl element, said flat spring being clamped between said radial extension and said ramp surface of the slide block in its rest position.

* * * * *